US010986264B2

(12) United States Patent
Ejiri et al.

(10) Patent No.: US 10,986,264 B2
(45) Date of Patent: Apr. 20, 2021

(54) IMAGE PROCESSING DEVICE, IMAGE PROCESSING METHOD, IMAGE SENSOR, AND INFORMATION PROCESSING DEVICE

(71) Applicant: SONY SEMICONDUCTOR SOLUTIONS CORPORATION, Kanagawa (JP)

(72) Inventors: Jun Ejiri, Tokyo (JP); Masayuki Tachi, Kanagawa (JP); Yusuke Minagawa, Tokyo (JP); Teruhiko Mochizuki, Tokyo (JP); Nobuyuki Asakura, Tokyo (JP); Michimasa Obana, Tokyo (JP); Hisashi Nishimaki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/308,590

(22) PCT Filed: Jun. 9, 2017

(86) PCT No.: PCT/JP2017/021446
§ 371 (c)(1),
(2) Date: Dec. 10, 2018

(87) PCT Pub. No.: WO2017/221741
PCT Pub. Date: Dec. 28, 2017

(65) Prior Publication Data

US 2019/0158730 A1 May 23, 2019

(30) Foreign Application Priority Data

Jun. 23, 2016 (JP) ............................ JP2016-124648

(51) Int. Cl.
*H04N 5/232* (2006.01)
*G03B 15/00* (2021.01)
(Continued)

(52) U.S. Cl.
CPC ......... *H04N 5/23218* (2018.08); *G03B 15/00* (2013.01); *G03B 15/14* (2013.01);
(Continued)

(58) Field of Classification Search
CPC ............... H04N 5/23218; H04N 5/232; H04N 5/23245; H04N 5/232411; H04N 5/23219;
(Continued)

(56) References Cited

U.S. PATENT DOCUMENTS 8,886,953 B1 * 11/2014 Sipe ...................... H04W 12/06 713/186
9,769,307 B2 * 9/2017 Schrage .................. H04M 1/67
(Continued)

FOREIGN PATENT DOCUMENTS

JP 2007-116602 A 5/2007
JP 2007116602 A * 5/2007 ............ H04M 1/667
(Continued)

OTHER PUBLICATIONS

International Search Report and Written Opinion of PCT Application No. PCT/JP2017/021446, dated Aug. 22, 2017, 07 pages of ISRWO.

*Primary Examiner* — Nhan T Tran
(74) *Attorney, Agent, or Firm* — Chip Law Group

(57) ABSTRACT

The present technology relates to an image processing device, an image processing method, an image sensor, an information processing device, and a program that facilitate cancellation of a locked state. An image processing device includes: a detection unit that detects a predetermined state,
(Continued)

using data from a plurality of sensors; and an imaging unit that captures an image of a predetermined object, in a case where the predetermined state is detected by the detection unit. The image processing device further includes a plurality of input interfaces that input the data from the plurality of sensors. When an application processor switches from an activated state to a non-activated state, detection by the detection unit is started. The present technology can be applied to a smartphone, for example.

16 Claims, 11 Drawing Sheets

(51) Int. Cl.

| | |
|---|---|
| ***G06F 21/32*** | (2013.01) |
| ***G03B 17/02*** | (2021.01) |
| ***H04M 1/67*** | (2006.01) |
| ***G03B 15/14*** | (2021.01) |
| *G06F 3/041* | (2006.01) |

(52) U.S. Cl.
CPC ............. *G03B 17/02* (2013.01); *G06F 21/32* (2013.01); *H04M 1/67* (2013.01); *H04N 5/232* (2013.01); *G06F 3/041* (2013.01); *H04M 2250/52* (2013.01)

(58) Field of Classification Search
CPC ........ G03B 15/00; G03B 15/14; G03B 17/02; G06F 21/32; G06F 3/041; H04M 1/67; H04M 2250/52
See application file for complete search history.

(56) References Cited

U.S. PATENT DOCUMENTS

| | | | | |
|---|---|---|---|---|
| 10,279,742 B2 * | 5/2019 | Shiga | ...................... | B60R 11/02 |
| 2010/0097515 A1 * | 4/2010 | Ishii | .................. | H04N 5/23212 348/349 |
| 2012/0081392 A1 * | 4/2012 | Arthur | ............... | H04N 5/23222 345/633 |
| 2017/0053109 A1 * | 2/2017 | Han | ........................ | G06F 21/32 |
| 2017/0249003 A1 * | 8/2017 | Nonogaki | ............. | G06F 1/1613 |

FOREIGN PATENT DOCUMENTS

| | | |
|---|---|---|
| JP | 2011-048665 A | 3/2011 |
| JP | 2014-110009 A | 6/2014 |
| JP | 2016-052132 A | 4/2016 |

* cited by examiner

IMAGE PROCESSING DEVICE, IMAGE PROCESSING METHOD, IMAGE SENSOR, AND INFORMATION PROCESSING DEVICE

CROSS REFERENCE TO RELATED APPLICATIONS

This application is a U.S. National Phase of International Patent Application No. PCT/JP2017/021446 filed on Jun. 9, 2017, which claims priority benefit of Japanese Patent Application No. JP 2016-124648 filed in the Japan Patent Office on Jun. 23, 2016. Each of the above-referenced applications is hereby incorporated herein by reference in its entirety.

TECHNICAL FIELD

The present technology relates to an image processing device, an image processing method, an image sensor, an information processing device, and a program. More particularly, the present technology relates to an image processing device, an image processing method, an image sensor, an information processing device, and a program that reduce the process to be performed by a user when a lock is released, for example.

BACKGROUND ART

Information processing devices such as smartphones that have a touch sensor or the like mounted thereon and perform an input operation in accordance with the position of an operating member with respect to the display screen are widely used these days. In such an information processing device, an unintended input operation is prevented by the use of a lock function that restricts input operations (Patent Document 1, for example). To use the functions of an application in a locked state, the user performs an unlocking operation and an application starting operation.

CITATION LIST

Patent Document

Patent Document 1: Japanese Patent Application Laid-Open No. 2011-48665

SUMMARY OF THE INVENTION

Problems to be Solved by the Invention

However, there is a markedly increasing demand for higher operability in the above described information processing devices these days. In view of such circumstances, it is preferable to increase operability before an application is started.

The present technology has been made in view of such circumstances, and aims to improve the operability before an application is activated.

Solutions to Problems

An image processing device according to an aspect of the present technology includes: a detection unit that detects a predetermined state, using data from a plurality of sensors; and an imaging unit that captures an image of a predetermined object, in a case where the predetermined state is detected by the detection unit.

An image processing method according to an aspect of the present technology includes the steps of: detecting a predetermined state, using data from a plurality of sensors; and capturing an image of a predetermined object, in a case where the predetermined state is detected.

A program according to an aspect of the present technology is a program for causing a computer to perform a process including the steps of: detecting a predetermined state, using data from a plurality of sensors; and capturing an image of a predetermined object, in a case where the predetermined state is detected.

An image sensor according to an aspect of the present technology includes: a detection unit that detects a predetermined state, using data from a plurality of sensors; and an imaging unit that captures an image of a predetermined object, in a case where the predetermined state is detected by the detection unit.

An information processing device according to an aspect of the present technology includes: a plurality of sensors; an image sensor; and an application processor. In the information processing device, the image sensor includes: a plurality of input interfaces that input data from the plurality of sensors; a detection unit that detects a predetermined state, using the data from the plurality of sensors input via the input interfaces; and an imaging unit that captures an image of a predetermined object, in a case where the predetermined state is detected by the detection unit.

In the image processing device, the image processing method, and the program according to an aspect of the present technology, data from a plurality of sensors are used to detect a predetermined state, and an image of a predetermined object is captured in a case where the predetermined state is detected.

In the image sensor according to an aspect of the present technology, data from a plurality of sensors are used to detect a predetermined state, and an image of a predetermined object is captured in a case where the predetermined state is detected.

The information processing device according to an aspect of the present technology includes a plurality of sensors, an image sensor, and an application processor. The image sensor includes: a plurality of input interfaces that input data from the plurality of sensors; a detection unit that detects a predetermined state, using the data from the plurality of sensors input via the input interfaces; and an imaging unit that captures an image of a predetermined object, in a case where the predetermined state is detected by the detection unit.

Note that the image processing device or the information processing device may be an independent device, or may be an internal block in a single device.

Further, the program to be provided may be transmitted via a transmission medium or may be recorded on a recording medium.

Effects of the Invention

According to an aspect of the present technology, it is possible to improve operability before an application is activated.

Note that effects of the present technology are not limited to the effects described herein, and may include any of the effects described in the present disclosure.

MODE FOR CARRYING OUT THE INVENTION

The following is a description of a mode (hereinafter referred to as the embodiment) for carrying out the present technology.

<Configuration of the Exterior of an Information Processing Device>

Figure 1:
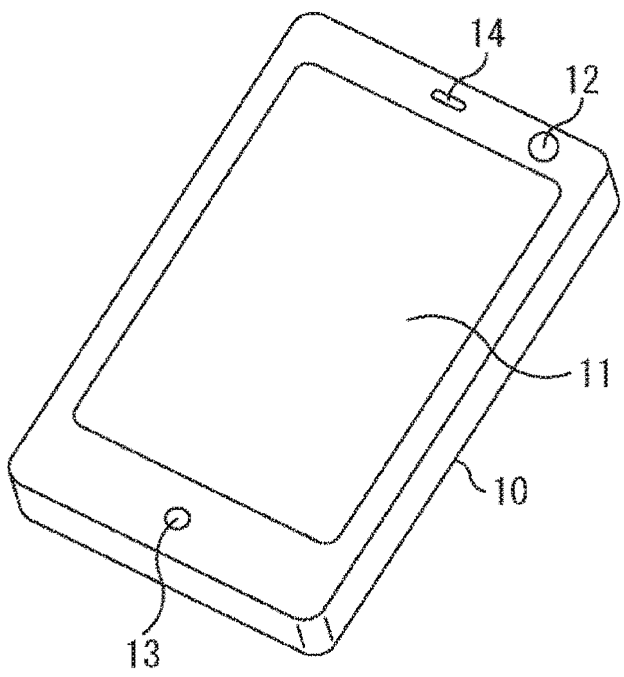
FIG. 1 is a diagram showing the configuration of the exterior of an embodiment of a terminal to which the present technology is applied.

FIG. 1 is a diagram showing the configuration of the exterior of an embodiment of an information processing device including an image processing device to which the present technology is applied. As shown in FIG. 1, a terminal 10 as an information processing device includes a display unit 11, an imaging unit 12, a microphone 13, and a speaker 14 on a surface of the housing.

A sensor is superimposed on the display unit 11, a so-called graphical user interface (GUI) is displayed on the display unit 11, and the user inputs an instruction by operating the GUI. An instruction from the user can also be input from an operation unit including a plurality of buttons (not shown). Further, an instruction from the user can also be input through a voice input.

The terminal 10 is an example of an information processing device that has an improved operability in an application starting operation from a locked state. For example, the terminal 10 is an information processing device that is typically a portable telephone device such as a smartphone, or a portable music reproduction device, a portable video processing device, a portable game machine, a notebook personal computer (PC), a tablet PC, or the like. In addition, although a portable terminal device is described as an example herein, the present technology can also be applied to any information processing device having a lock function.

<Internal Configuration of the Information Processing Device>

Figure 2:
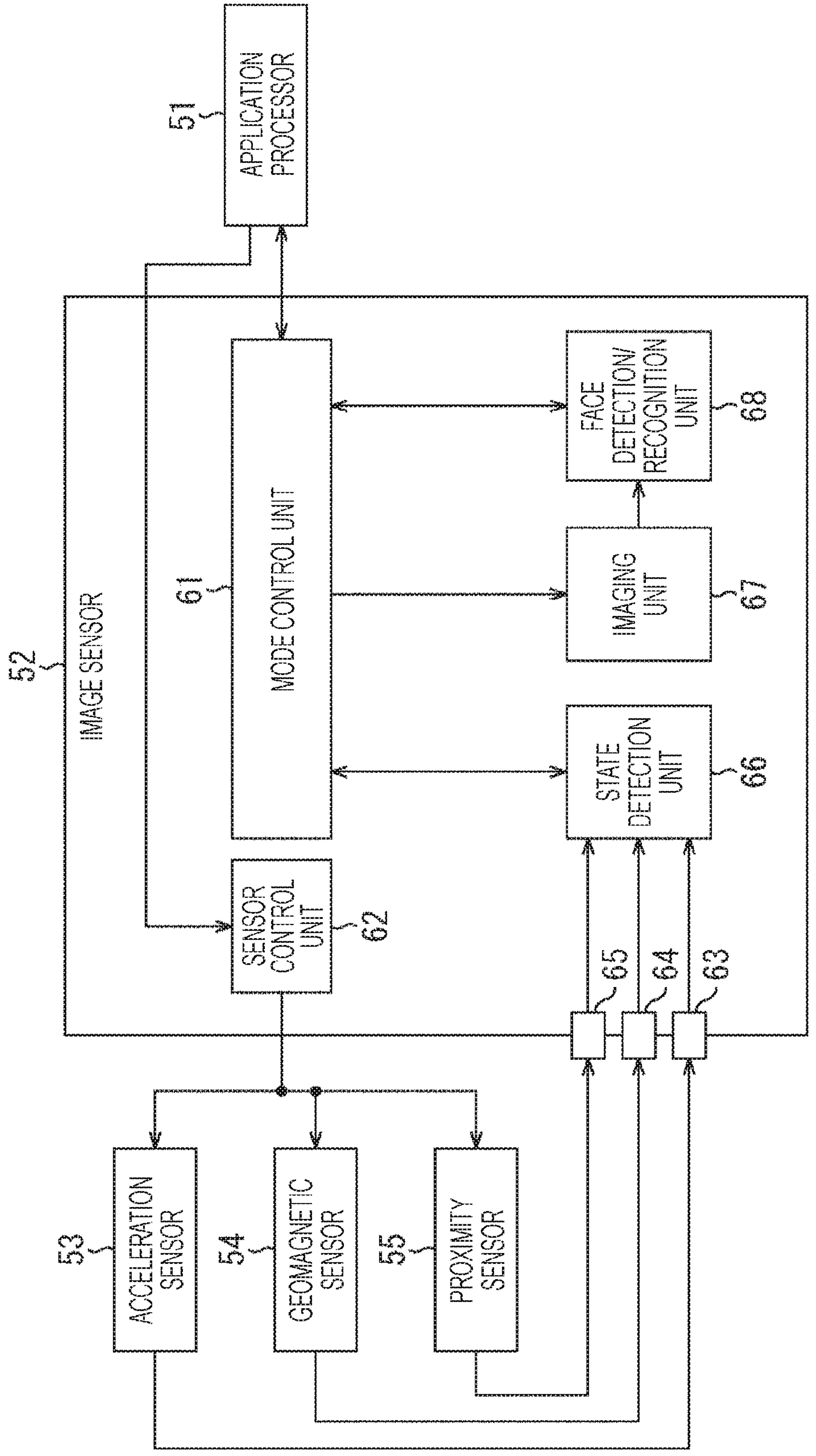
FIG. 2 is a diagram showing an example internal configuration of the terminal.

FIG. 2 is a diagram showing the internal configuration of the terminal 10. Note that, in a case where the terminal 10 is a smartphone, for example, the terminal 10 has a plurality of functions such as a call function and a function to connect to a network. However, the configuration for realizing the function related to unlocking is shown in the drawing and is explained herein.

The terminal 10 includes an application processor 51, an image sensor 52, an acceleration sensor 53, a geomagnetic sensor 54, and a proximity sensor 55. Further, the image sensor 52 includes a mode control unit 61, a sensor control unit 62, a sensor input interface 63, a sensor input interface 64, a sensor input interface 65, a state detection unit 66, an imaging unit 67, and a face detection/recognition unit 68.

The application processor 51 can be formed with a semiconductor integrated circuit capable of processing various applications, and controls the respective components in the terminal 10. In this embodiment, the image sensor 52 has not only a function of performing imaging with the imaging unit 67, but also functions of detecting the state of the terminal 10 to unlock as described later and recognizing the user. The image sensor 52 also functions as an image processing device that processes captured images.

The terminal 10 includes a plurality of sensors, and, in this example, includes three terminals as shown in FIG. 53. The acceleration sensor 53 is a sensor that detects acceleration as a voltage value. The acceleration sensor 53 may be designed as a three-axis acceleration sensor that detects acceleration in the X-axis direction, acceleration in the Y-axis direction, and acceleration in the Z-axis direction. The acceleration sensor 53 supplies the detected acceleration data to the state detection unit 66 via the sensor input interface 63 provided in the image sensor 52.

The geomagnetic sensor 54 is a sensor that detects geomagnetism as a voltage value. The geomagnetic sensor 54 may be a three-axis geomagnetic sensor that detects geomagnetism in the X-axis direction, geomagnetism in the Y-axis direction, and geomagnetism in the Z-axis direction. The geomagnetic sensor 54 supplies the detected geomagnetism data to the state detection unit 66 via the sensor input interface 64 provided in the image sensor 52.

The proximity sensor 55 is a sensor that detects approach of a detection target in a non-contact manner. In this case, the proximity sensor 55 is a sensor that detects an environment around the terminal 10, such as an environment in a bag or an environment in a pocket, for example. The proximity sensor 55 supplies the detected environment data to the state detection unit 66 via the sensor input interface 65 provided in the image sensor 52.

As described above, the image sensor 52 includes a plurality of input interfaces for inputting data detected by a plurality of sensors to the inside.

Note that, in the following description, the three sensors, which are the acceleration sensor 53, the geomagnetic sensor 54, and the proximity sensor 55, will be described as examples. However, other sensors such as a gyro sensor and an atmospheric pressure sensor may also be included. The image sensor 52 further includes a plurality of input interfaces for inputting data from the plurality of sensors provided in the terminal 10 to the inside.

Furthermore, in the following description, the image sensor 52 includes a plurality of input interfaces for inputting data from the plurality of sensors to the inside. However, the image sensor 52 may include sensors such as the acceleration sensor 53, the geomagnetic sensor 54, and the proximity sensor 55. In such a configuration, the image sensor 52 may not include the plurality of input interfaces for inputting data from the plurality of sensors to the inside.

The mode control unit 61 of the image sensor 52 switches modes in accordance with an instruction from the application processor 51, and controls each component in the image sensor 52 in a predetermined mode. Note that the modes and others will be described later in appropriate order.

Furthermore, in accordance with an instruction from the application processor 51, the sensor control unit 62 controls the plurality of sensors, such as the acceleration sensor 53, the geomagnetic sensor 54, and the proximity sensor 55, in a predetermined mode. As will be described later, the sensor control unit 62 controls the sensors in the terminal 10 in a locked state. In an unlocked state, the sensors may be controlled by a control unit (an operation system) (not shown).

The state detection unit 66 detects the state of the terminal 10, in accordance with the data obtained from the plurality of sensors, such as the acceleration sensor 53, the geomagnetic sensor 54, and the proximity sensor 55. The state to be detected is a state in which the terminal 10 has been lifted up and held by the user, for example.

For example, when the terminal 10 is in a locked state, the terminal 10 is on a desk or the like. When the user wishes to use the terminal 10, the terminal 10 is lifted up and held by the user. Such a state in which the terminal 10 is lifted up and held by the user is detected by the state detection unit 66 using the data from the plurality of sensors.

The imaging unit 67 forms the imaging unit 12 shown in FIG. 1. The imaging unit 67 has the configuration described below with reference to FIG. 3, and has a function of imaging an object.

The face detection/recognition unit 68 determines whether or not a face has been detected from an image captured by the imaging unit 67. If it is determined that a face has been detected, the face detection/recognition unit 68 further determines whether or not the detected face is the face of a registered user.

<Configuration of the Imaging Unit>

Figure 3:
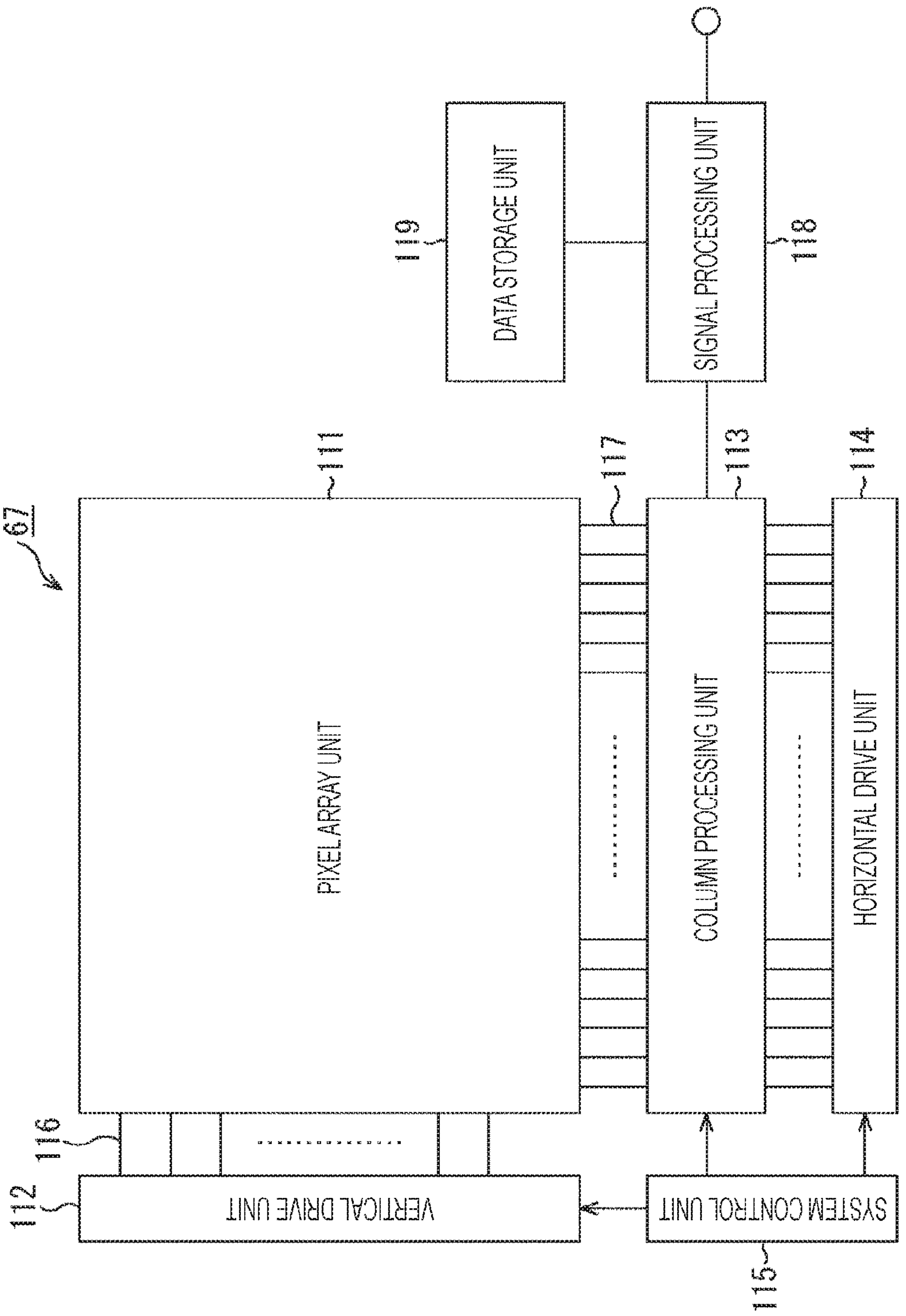
FIG. 3 is a diagram showing an example internal configuration of an imaging unit.

FIG. 3 shows an example configuration of the imaging unit 67. The diagram of the imaging unit 67 shown in FIG. 3 is a diagram schematically showing the configuration of a CMOS image sensor that is an X-Y address imaging device, for example. Here, a CMOS image sensor is an image sensor manufactured by applying the CMOS process or partially using the CMOS process.

The imaging unit 67 shown in FIG. 3 includes a pixel array unit 111 formed on a semiconductor substrate that is not shown in the drawing, and a peripheral circuit unit integrated on the same semiconductor substrate as the pixel array unit 111. The peripheral circuit unit is formed with a vertical drive unit 112, a column processing unit 113, a horizontal drive unit 114, and a system control unit 115, for example.

The imaging unit 67 further includes a signal processing unit 118 and a data storage unit 119. The signal processing unit 118 and the data storage unit 119 may be mounted on the same substrate as the imaging unit 67, or may be disposed on a different substrate from the imaging unit 67. Also, the respective processes to be performed by the signal processing unit 118 and the data storage unit 119 may be performed as processes to be performed by an external signal processing unit provided on a different substrate from the imaging unit 67, such as a digital signal processor (DSP) circuit or software.

The pixel array unit 111 has a configuration in which unit pixels (hereinafter also referred to simply as pixels in some cases) are two-dimensionally arranged in the row direction and the column direction, or in a matrix fashion. The unit pixels each have a photoelectric conversion unit that generates and accumulates optical charges in accordance with the amount of received light. Here, the row direction means the array direction of the pixels in pixel rows, or the horizontal direction. The column direction means the array direction of the pixels in the pixel columns, or the vertical direction.

In the matrix-like pixel array of the pixel array unit 111, pixel drive lines 116 are provided in the row direction in the respective pixel rows, and vertical signal lines 117 are provided in the column direction in the respective pixel columns. The pixel drive lines 116 transmit drive signals for performing driving when signals are read from the pixels. In FIG. 3, each pixel drive line 116 is shown as one wiring line, but is not necessarily one wiring line. One end of each of the pixel drive lines 116 is connected to the output end of the vertical drive unit 112 corresponding to each row.

The vertical drive unit 112 is formed with a shift register, an address decoder, and the like, and drives the respective pixels in the pixel array unit 111 collectively or row by row, for example. In other words, the vertical drive unit 112, together with the system control unit 115 that controls the vertical drive unit 112, forms a drive unit that drives the respective pixels in the pixel array unit 111. The configuration of the vertical drive unit 112 is not specifically shown in the drawing, but normally has a configuration that includes two scanning systems: a read scanning system and a sweep scanning system.

To read signals from the unit pixels, the read scanning system sequentially selects and scans the unit pixels in the pixel array unit 111 row by row. The signals to be read from the unit pixels are analog signals. The sweep scanning system performs sweep scanning on the read row on which read scanning is to be performed by the read scanning system, prior to the read scanning by the time equivalent to the shutter speed.

Through the sweep scanning by this sweep scanning system, unnecessary charges are swept out of the photoelectric conversion units of the unit pixels of the read row, and thus, the photoelectric conversion units are reset. Then, as the unnecessary charges are swept (reset) by the sweep scanning system, a so-called electronic shutter operation is performed. Here, an electronic shutter operation is an operation to discard optical charges of the photoelectric conversion units, and newly start exposure (start accumulating optical charges).

The signals read through the reading operation performed by the read scanning system correspond to the amount of light received after the previous reading operation or electronic shutter operation. In addition, the period from the time of reading in the previous reading operation or the time of scanning in the previous electronic shutter operation to the time of reading in the current reading operation is the period of exposure of the optical charges at the unit pixels.

The signals output from the respective unit pixels of the pixel row selected and scanned by the vertical drive unit 112 are input to the column processing unit 113 through the respective vertical signal lines 117 of the pixel columns. For the respectively pixel columns of the pixel array unit 111, the column processing unit 113 performs predetermined signal processing on the signals output from the respective pixels of a selected row through the vertical signal lines 117, and temporarily holds the pixel signals subjected to the signal processing.

Specifically, the column processing unit 113 performs at least a denoising process such as a correlated double sampling (CDS) process as the signal processing. Through this CDS process performed by the column processing unit 113, reset noise and the fixed pattern noise unique to the pixels, such as a threshold variation among the amplification transistors in the pixels, are removed. The column processing unit 113 can be made not only to perform the denoising process but also to have an analog-digital (AD) conversion function, for example, and convert analog pixel signals into digital signals to be output.

The horizontal drive unit 114 is formed with a shift register, an address decoder, and the like, and sequentially selects the unit circuits corresponding to the pixel columns of the column processing unit 113. Through this selective scanning performed by the horizontal drive unit 114, the pixel signals subjected to the signal processing by the column processing unit 113 for the respective unit circuits are sequentially output.

The system control unit 115 includes a timing generator that generates various timing signals and the like, and performs drive control on the vertical drive unit 112, the column processing unit 113, the horizontal drive unit 114, and the like, in accordance with the various timings generated by the timing generator.

The signal processing unit 118 has at least an arithmetic processing function, and performs various kinds of signal processing such as arithmetic processing on the pixel signals that are output from the column processing unit 113. The data storage unit 119 temporarily stores the data necessary for the signal processing to be performed by the signal processing unit 118.

When receiving an instruction from the mode control unit 61, the imaging unit 67 having such a configuration performs imaging, and supplies (the image data of) the captured image to the face detection/recognition unit 68.

<Configuration of the State Detection Unit>

Figure 4:
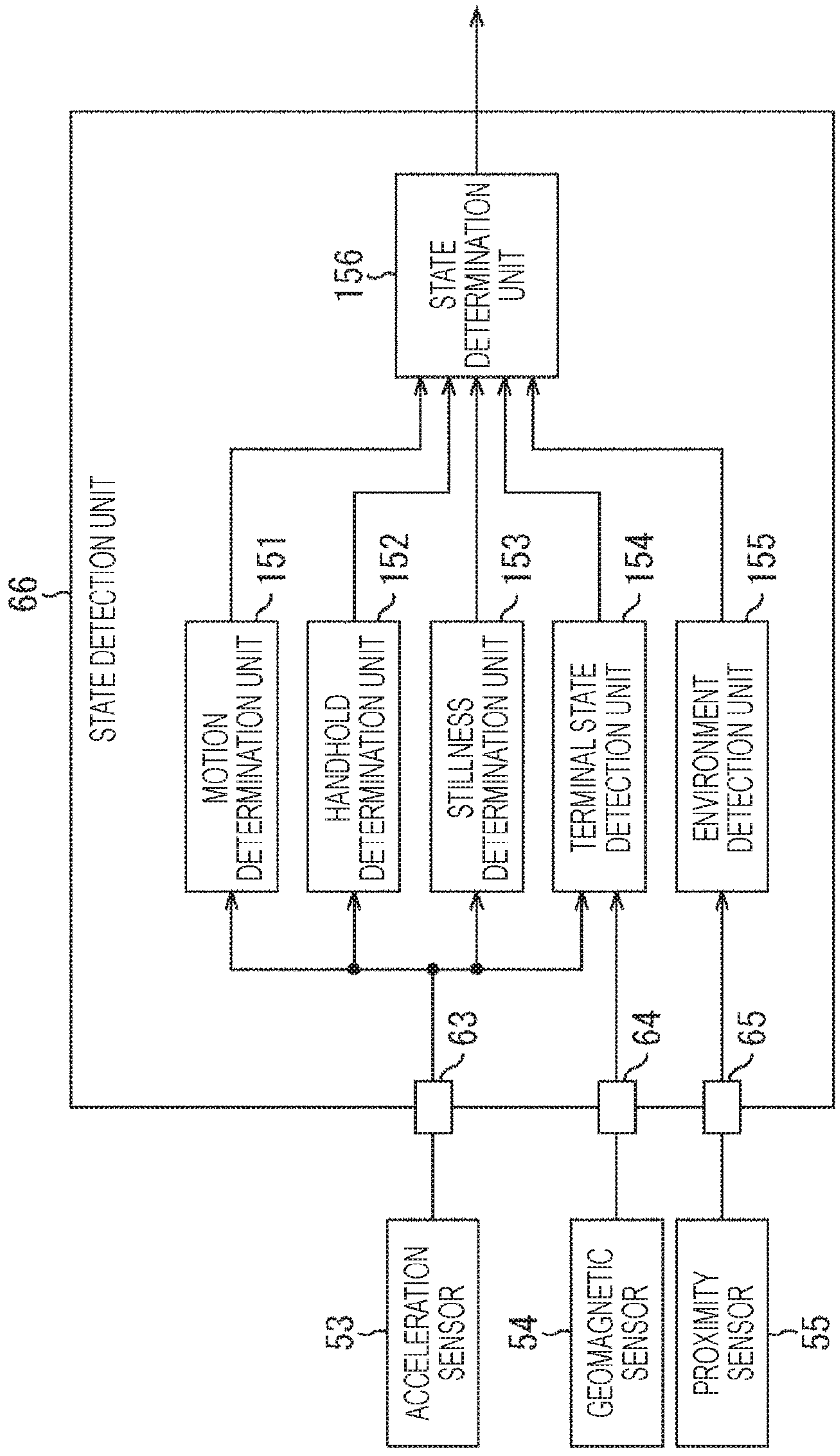
FIG. 4 is a diagram showing an example internal configuration of a state detection unit.

FIG. 4 is a diagram showing an example configuration of the state detection unit 66 (FIG. 2) included in the image sensor 52. The state detection unit 66 includes a motion determination unit 151, a handhold determination unit 152, a stillness determination unit 153, a terminal state detection unit 154, an environment detection unit 155, and a state determination unit 156.

Data from the acceleration sensor 53 is supplied to the motion determination unit 151, the handhold determination unit 152, the stillness determination unit 153, and the terminal state detection unit 154 via the sensor input interface 63. Data from the geomagnetic sensor 54 is also supplied to the terminal state detection unit 154 via the sensor input interface 64.

Data from the proximity sensor 55 is supplied to the environment detection unit 155 via the sensor input interface 65.

Using the data from the acceleration sensor 53, mainly the Z-axis direction data, the motion determination unit 151 determines, from the acceleration, whether or not the terminal 10 has been moved.

Using the data from the acceleration sensor 53, manly the Z-axis direction data, the handhold determination unit 152 determines whether or not the terminal 10 remains still while the terminal 10 is held with a hand of the user.

Using the data from the acceleration sensor 53, mainly the X-axis direction data and the Y-axis direction data, the stillness determination unit 153 determines whether or not the terminal 10 remains still.

Both the handhold determination unit 152 and the stillness determination unit 153 make determination as to whether or not the terminal 10 remains still. The handhold determination unit 152 determines whether or not the terminal 10 remains still while being held with a hand of the user, but the stillness determination unit 153 determines whether or not the terminal 10 remains still while being left on a desk or the like.

Using the data from the acceleration sensor 53 and the geomagnetic sensor 54, the terminal state detection unit 154 detects a state of the terminal 10, such as what angle the terminal 10 has with respect to the ground, for example, and determines whether or not the state of the terminal 10 is a state in which detection is prohibited.

As will be described later, a process of detecting a face is to be performed. Therefore, a state in which detection is prohibited is a state in which any image of a face cannot be captured. For example, when the imaging unit 12 of the terminal 10 is facing downward, in other words, when the terminal 10 is parallel to the ground, only an image of the ground is captured, and any image of the face of the user cannot be captured. Therefore, when a face is to be detected, a state in which any face cannot be detected is set as a state in which detection is prohibited (a detection prohibited state).

Using the data from the proximity sensor 55, the environment detection unit 155 determines whether or not the environment around the terminal 10 is a detection prohibited environment. A detection prohibited environment means a case where the possibility of an image of a face being captured even is low in the environment even if imaging is performed.

For example, in an environment where the terminal 10 is in a bag, the possibility that an image of a face will be captured is low even if imaging is performed. Therefore, such an environment where the terminal 10 is in a bag is a detection prohibited environment. Further, in an environment where the terminal 10 is in a pocket, for example, the possibility that an image of a face will be captured is also low even if imaging is performed. Therefore, such an environment where the terminal 10 is in a pocket is also a detection prohibited environment.

The state determination unit 156 determines the state of the terminal 10, using the respective determination results supplied from the motion determination unit 151, the handhold determination unit 152, the stillness determination unit 153, the terminal state detection unit 154, and the environment detection unit 155.

Here, a time when the user wishes to use a locked terminal 10 is referred to as a use start state.

A use start state can be determined from the respective determination results supplied from the motion determination unit 151, the handhold determination unit 152, and the stillness determination unit 153. However, only with the determination results from the motion determination unit 151, the handhold determination unit 152, and the stillness determination unit 153, a use start state might be erroneously detected when the user is walking or is in a vehicle, for example.

As the respective determination results from the terminal state detection unit 154 and the environment detection unit 155 are further used, it is possible to reduce the possibility of such erroneous detection. Therefore, as one example of this embodiment, the state determination unit 156 determines a state of the terminal 10, using the respective determination results from the motion determination unit 151, the handhold determination unit 152, the stillness determination unit 153, the terminal state detection unit 154, and the environment detection unit 155. With such a case being taken as an example, explanation will be continued below.

<Configuration of the Face Detection/Recognition Unit>

Figure 5:
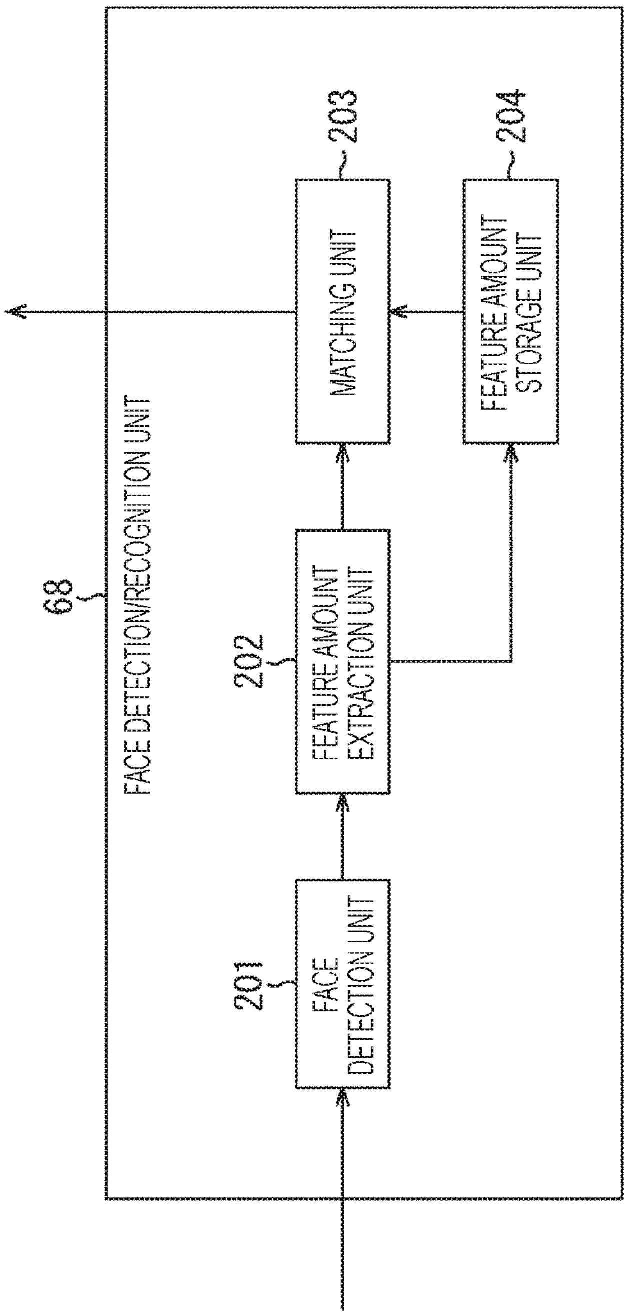
FIG. 5 is a diagram showing an example internal configuration of a face detection/recognition unit.

FIG. 5 is a diagram showing the internal configuration of the face detection/recognition unit 68. The face detection/recognition unit 68 includes a face detection unit 201, a feature amount extraction unit 202, a matching unit 203, and a feature amount storage unit 204.

The face detection unit 201 analyzes an image supplied from the imaging unit 67, and detects a region determined to be a face. In a case where a region that can be determined to be a face is detected by the face detection unit 201, a feature amount is extracted from the face by the feature amount detection unit 202.

For example, the feature amount extraction unit 202 detects parts such as the eyes, the nose, and the mouth, which constitute a face, from the region determined to be a face, and extracts the sizes, the positional relationship, and the like as feature amounts. The extracted feature amounts are supplied to the matching unit 203.

When a process of registering the user of the terminal 10 is performed, the feature amounts extracted by the feature amount extraction unit 202 are supplied to the feature amount storage unit 204 and are registered therein. In other words, the feature amounts extracted from an image of the face of the user registered as the user of the terminal 10 are stored in the feature amount storage unit 204.

The feature amounts of a plurality of users may be stored, or only the feature amounts of one user may be stored. That is, a plurality of persons may be registered as the users of the terminal 10, or only one person may be registered as the user of the terminal 10.

According to the present technology, a locked state of the terminal 10 can be canceled by face authentication (face recognition). Thus, in a case where a plurality of persons are registered, for example, when the lock is released, it is possible to take measures corresponding to each recognized user by activating the screen corresponding to the user, such as a standby screen, or a predetermined application, for example.

The matching unit 203 performs matching between the feature amounts supplied from the feature amount extraction unit 202 and the feature amounts stored in the feature amount storage unit 204, and determines whether or not the user (the user captured in the image) as the current process target is a user registered as the user of the terminal 10.

It is possible for the matching unit 203 to determine whether or not the user is a registered user, and the determination result may be supplied to the mode control unit 61. Alternatively, the matching unit 203 may calculate a matching degree indicating the probability of the user being a registered user, and supply the matching degree to the mode control unit 61, so that the mode control unit 61 can determine whether or not the user is a registered user.

For example, in a case where the mode control unit 61 is to determine whether or not the user is a registered user, if the matching degree shows a numerical value within such a range that it is difficult to determine whether or not the user is a registered user, the mode control unit 61 can instruct the imaging unit 67 to again perform imaging, or instruct the face detection/recognition unit 68 to again perform face detection or face recognition.

<Operation of the Terminal>

Figure 6:
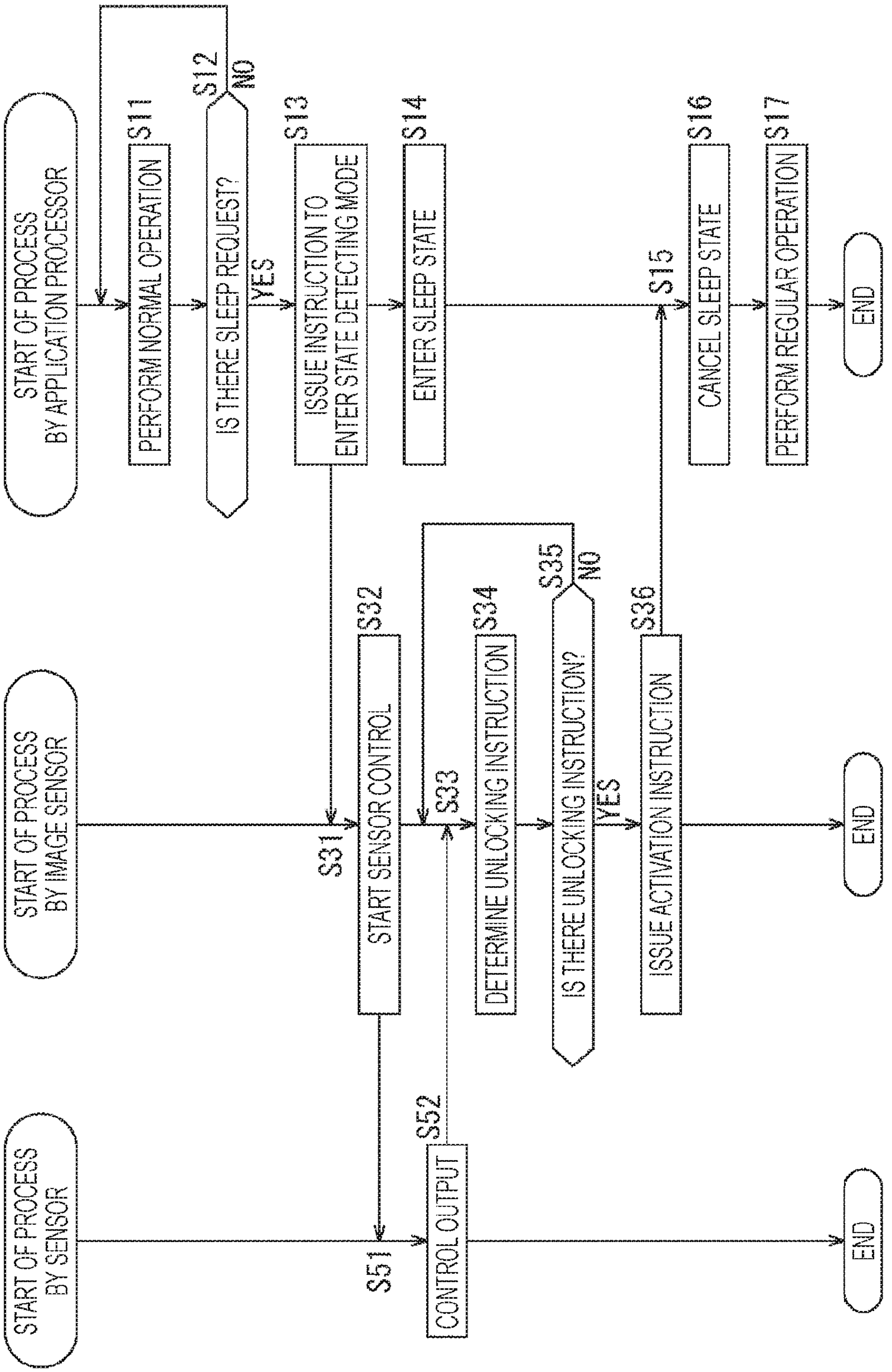
FIG. 6 is a flowchart for explaining operation of the terminal.

Referring now to the flowchart shown in FIG. 6, operations of the sensors such as the application processor 51, the image sensor 52, and the acceleration sensor 53 shown in FIG. 2 are described.

In step S11, the application processor 51 is in its normal operation. When the application processor 51 is in the normal operation, the application processor 51 is on and is controlling a predetermined application. Further, when the application processor 51 is in the normal operation, the user is using the terminal 10, and is not locked.

Note that, although not shown in the drawing, the operation system of the terminal 10 is also on, and is performing a process according to an instruction or the like from the user.

In a case where an instruction is issued from the user or a case where any operation has not been performed for a predetermined time, for example, the terminal 10 switches to a sleep state. An instruction to switch to the sleep state is issued from the operation system to the application processor 51.

In the sleep state, the operation system and the application processor 51 are in a non-activated state, and the power consumption is reduced. In addition, the switch to the sleep state is performed when an instruction is issued from the user as described above, but is also performed in a case where a predetermined time has passed without the terminal 10 being operated.

Furthermore, in a case where the terminal 10 switches to the sleep state, the terminal 10 also switches to a locked state so that any false operation occurs, and any unauthorized user who is not a registered user cannot operate the terminal 10. In the locked state, the terminal 10 cannot be operated. For example, in such a state, any application cannot be activated, any process with the application cannot be performed, or any telephone call cannot be made.

Note that explanation will be continued on the assumption that the terminal 10 enters the locked state when entering the sleep state. However, the terminal 10 may not enter the locked state when entering the sleep state. In other words, the terminal 10 enters the sleep state and operates with low electric power, but may not enter the locked state, to continue to receive instructions from the user.

In the description below, the terminal 10 enters the locked state when entering the sleep state, and the locked state is canceled by the process described below. However, when the terminal 10 is in the sleep state but not in the locked state, the process described below can also be applied in a case where the sleep state is canceled, for example.

In other words, the present technology is applied not only when a locked state is canceled, but also when some other state such as a sleep state is canceled, for example.

In step S12, the application processor 51 determines whether or not there is a sleep request from the operation system. The application processor 51 returns to step S11 and continues the normal operation until it is determined that there is a sleep request.

If determining that there is a sleep request in step S12, on the other hand, the application processor 51 moves on to step S13. In step S13, the application processor 51 issues an instruction to the image sensor 52 to switch to a state detecting mode. In addition to issuing such an instruction, the application processor 51 switches to the sleep state in step S14.

In step S31, the image sensor 52 receives an instruction from the application processor 51, to switch to the state detecting mode. The state detecting mode is a mode for canceling the locked state of the terminal 10 and detecting the user's intention to use the terminal 10. Specifically, the state detecting mode is a mode in which the terminal 10 being held by the user is detected while an image of the face of the user is being captured.

After entering the state detecting mode, the image sensor 52 starts sensor control in step S32. The sensor control unit 62 in the image sensor 52 controls the acceleration sensor 53, the geomagnetic sensor 54, and the proximity sensor 55 provided outside the image sensor 52. For example, these sensors are driven to perform control so that the state detection unit 66 inputs data at predetermined intervals via the sensor input interfaces 63 through 65.

In step S51, the image sensor 52 receives an instruction from the image sensor 52. In step S52, the image sensor 52 starts detection, and outputs detection results to the state detection unit 66.

After receiving the outputs from the sensors in step S33, the image sensor 52 determines an unlocking instruction in step S34. As will be described later with reference to the flowchart in FIG. 7, this unlocking instruction determination process includes, for example, determining whether or not the user is holding the terminal 10, detecting a face from a captured image, and determining whether or not the detected face is registered as the user of the terminal 10.

In step S35, the determination result of the unlocking instruction determination in step S34 is used to determine whether or not an unlocking instruction has been issued. The process returns to step S33, and the process in the state detecting mode is continued until it is determined in step S35 that an unlocking instruction has been issued.

If it is determined in step S35 that an unlocking instruction has been issued, on the other hand, the process moves on to step S36. In step S36, the mode control unit 61 of the image sensor 52 issues an activation instruction to the application processor 51. That is, in this case, the application processor 51 is in the sleep state and is in a non-activated state, an instruction for restarting is issued.

After receiving the activation instruction from the image sensor 52 in step S15, the application processor 51 moves on to step S16, to cancel the sleep state, and switch from the sleep state to the normal operation state. In step S17, the application processor 51 then starts the normal operation. As the application processor 51 starts the normal operation, the locked state is canceled.

As described above, when the terminal 10 is in a locked state, a process for promptly responding to an instruction to cancel the locked state is performed by the image sensor 52. As such a process is performed in the image sensor 52, power consumption can be reduced.

<Unlocking Instruction Determination Process in the Image Sensor>

Figure 7:
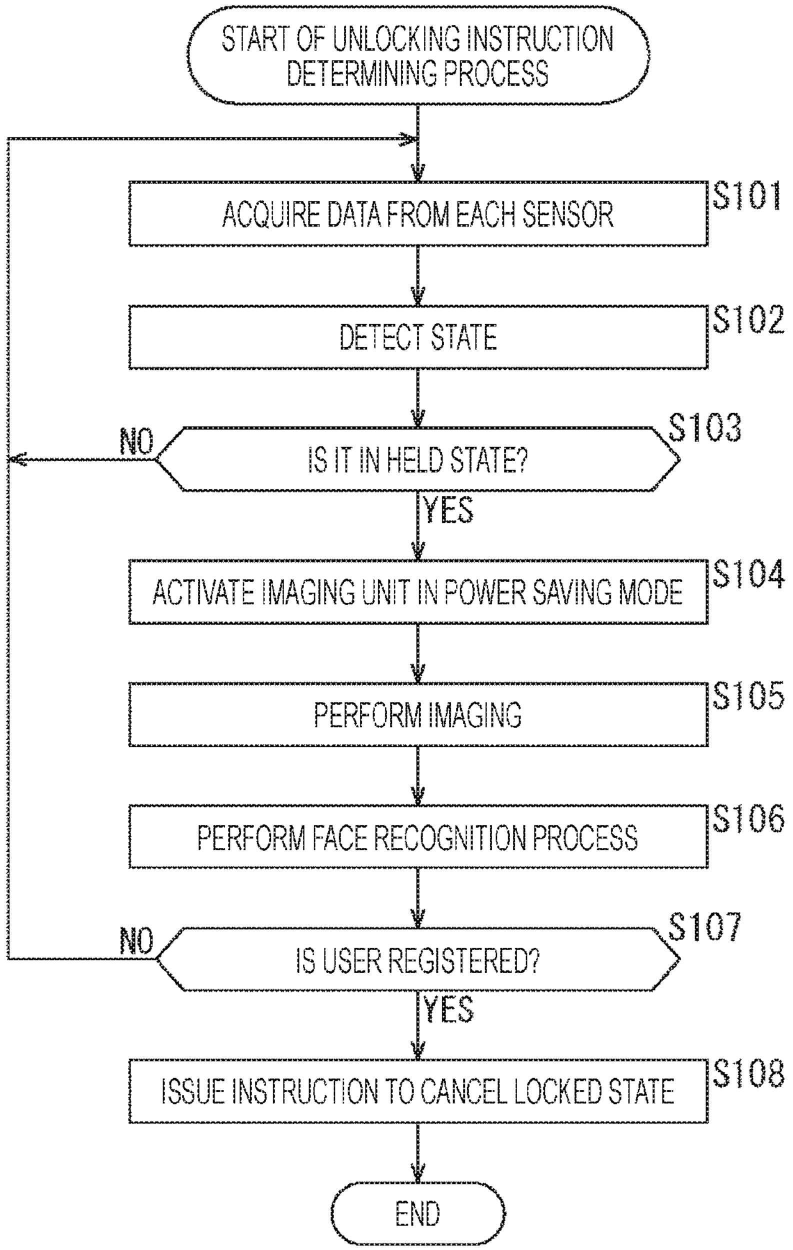
FIG. 7 is a flowchart for explaining operation of an image sensor.

Referring now to the flowchart in FIG. 7, the process relating to the unlocking instruction determination to be performed as the process in step S34 in the image sensor 52 is described.

In step S101, the state detection unit 66 acquires data from each of a plurality of sensors. In the case of the terminal 10 shown in FIG. 2, since the acceleration sensor 53, the geomagnetic sensor 54, and the proximity sensor 55 are provided as the plurality of sensors, data is acquired from each of these three sensors.

The image sensor 52 includes a plurality of input interfaces (the sensor input interfaces 63 through 65 in FIG. 2) for inputting data from sensors outside the image sensor 52. Through these input interfaces, data from the sensors is supplied to the state detection unit 66 in the image sensor 52.

In step S102, the state detection unit 66 detects the state of the terminal 10. The state detection unit 66 has the configuration described above with reference to FIG. 4, and performs motion determination, handhold determination, stillness determination, terminal state detection determination, and environment detection determination. From these determination results, the state detection unit 66 detects the state of the terminal 10.

What is to be detected as the state of the terminal 10 is a state of being left on a desk or the like (a stationary state), a state of walking (a state of being in a vehicle), a state of being in a bag, a pocket, or the like, for example. This detection is performed to determine whether or not a state in which the user is not using the terminal 10 has switched to a state in which the terminal 10 is being held by the user.

Further, detection is performed to determine whether or not the state in which the user is holding the terminal 10 has switched to a state in which the user is holding the terminal 10 in a stationary state at such a position that an image of the face can be captured.

To detect such a change in state, more accurate detection can be performed with a plurality of sensors than with a single sensor. Therefore, an example case where detection is performed with a plurality of sensors as described above is explained herein.

In step S103, the state detection unit 66 (the state determination unit 156 (FIG. 4) of the state detection unit 66) determines whether or not the terminal 10 is being held in such a state that an image of the user's face can be captured. The process returns to step S101 and the procedures thereafter are repeated until it is determined in step S103 that the terminal 10 is being held in such a state.

If it is determined in step S103 that the terminal 10 is in a held state, on the other hand, the process moves on to step S104. In a case where the state detection unit 66 detects that the terminal 10 is in a held state (in such a state that imaging is possible), the state detection unit 66 notifies the mode control unit 61 (FIG. 2) of the detection result. Upon receiving the notification from the state detection unit 66, the mode control unit 61 activates the imaging unit 67 in a power saving mode in step S104.

In other words, while the procedures in steps S101 through S103 are carried out, the state detection unit 66 is in an activated state, but the imaging unit 67 and the face detection/recognition unit 68 are in a non-activated state. In such a state, the imaging unit 67 is activated in step S104.

In the description below, the mode at the time during which the procedures in steps S101 through S103 are carried out will be referred to as the state detecting mode. Further, the mode at the time during which the procedures in steps S104 through S107 are carried out will be referred to as the face authenticating mode.

When there is a sleep request issued to the application processor 51, and an instruction to switch to a detecting mode is issued from the application processor 51 (the procedures in step S13 and step S31 in FIG. 6), the mode control unit 61 switches the inside of the image sensor 52 from an instruction waiting mode to the state detecting mode.

The instruction waiting mode is a state in which an instruction from the application processor 51 is awaited. In this instruction waiting mode, the state detection unit 66, the imaging unit 67, and the face detection/recognition unit 68 are in a non-activated state. Note that, since the imaging unit 67 is also used for capturing images or videos, the imaging unit 67 is activated as appropriate when the application processor 51 is operating an application for capturing images or videos, for example.

In the state detecting mode, the state detection unit 66 is in an activated state. When switching from the instruction waiting mode to the state detecting mode, the mode control unit 61 activates the state detection unit 66, and instructs the state detection unit 66 to receive data from a plurality of external sensors, and determine the state of the terminal 10.

In the state detecting mode, if the mode control unit 61 receives a determination result indicating that the terminal 10 is being held, the mode switches to the face recognizing mode. In a case where the mode switches to the face recognizing mode, the imaging unit 67 and the face detection/recognition unit 68 are activated. Note that, in the face recognizing mode, the state detection unit 66 may remain activated, or may be stopped.

When the imaging unit 67 is activated, imaging is performed. That is, the imaging unit 67 performs imaging in step S105 (FIG. 7). In the face recognizing mode, the imaging unit 67 is set to a low power mode.

For example, as described above with reference to FIG. 3, the imaging unit 67 includes the pixel array unit 111 in which a plurality of pixels are two-dimensionally arranged. In the low power mode (the face recognizing mode), imaging is performed not with all the pixels in the pixel array unit 111, but with a smaller number of pixels.

The number of pixels tends to become larger as the resolution has become higher in recent years. In the face recognizing mode, however, the resolution should be only high enough to recognize a face. Also, there is no need to recognize a plurality of persons at once, and only one person may be recognized from an image. Further, the one person to be recognized can be limited to the person who is captured in the central portion of the image.

With the above arrangement, not all the pixels in the pixel array unit 111 are used, but a smaller number of pixels can be used. For example, only the pixels located in a predetermined region such as the center region can be used. As only the limited pixels in the pixel array unit 111 are used, power consumption can be made smaller than that in a case where all the pixels in the pixel array unit 111 are used.

In step S105, the image (image data) captured by the imaging unit 67 is supplied to the face detection/recognition unit 68. The face detection/recognition unit 68 performs a face authentication process in step S106. The face detection/recognition unit 68 has the configuration described above with reference to FIG. 5, so that a region that can be determined to be a face is detected from the image supplied by the face detection unit 201, and feature amounts are extracted by the feature amount extraction unit 202 from the region determined to be a face.

The extracted feature amounts are then compared with the feature amounts stored in the feature amount storage unit 204 by the matching unit 203, and a check is made to determine whether or not the user is a registered user. That is, user authentication (user recognition) is performed.

In step S107, a check is made to determine whether or not the user is a registered user. This determination may be performed by the face detection unit recognition unit 68, and the result can be supplied to the mode control unit 61. Alternatively, from the face detection unit recognition unit 68, a matching degree indicating the probability that the user is a registered user may be supplied to the mode control unit 61, and the mode control unit 61 may determine whether or not the user is a registered user.

Note that, in step S106, the face authentication process is performed as described above. However, in a case where any face is not detected by the face detection unit 201 (FIG. 5), the procedures after the face detection unit 201 may not be carried out. Further, in a case where the procedures after the face detection unit 201 are not carried out if any face is not detected by the face detection unit 201 (FIG. 5), the user is determined not to be a registered user in step S107.

In a case where the user is determined not to be a registered user in step S107, the process returns to step S101, and the procedures thereafter are repeated.

If the user is determined to be a registered user in step S107, on the other hand, the process moves on to step S108. In step S108, the mode control unit 61 issues an instruction to cancel the locked state, to the application processor 51 (FIG. 2).

In this manner, when the state of the locked terminal 10 is detected, and the terminal 10 is determined to be in a held state, the image sensor captures an image of the user, and determines whether or not the user captured in the image is a registered user. When the user is determined to be a registered user, the image sensor 52 issues an instruction to cancel the locked state.

As the process is performed in the image sensor 52 in this manner, the user can cancel the locked state only by a simple operation. That is, the user can cancel the locked state simply by holding the terminal 10 in front of his/her face.

As described above, according to the present technology, it is possible to cancel a locked state of the terminal 10 without causing the user to perform any specific operation.

<Operation Modes and Power Modes of the Image Sensor>

According to the present technology, power consumption can be reduced. This is now described, with reference to FIG. 8.

Figure 8:
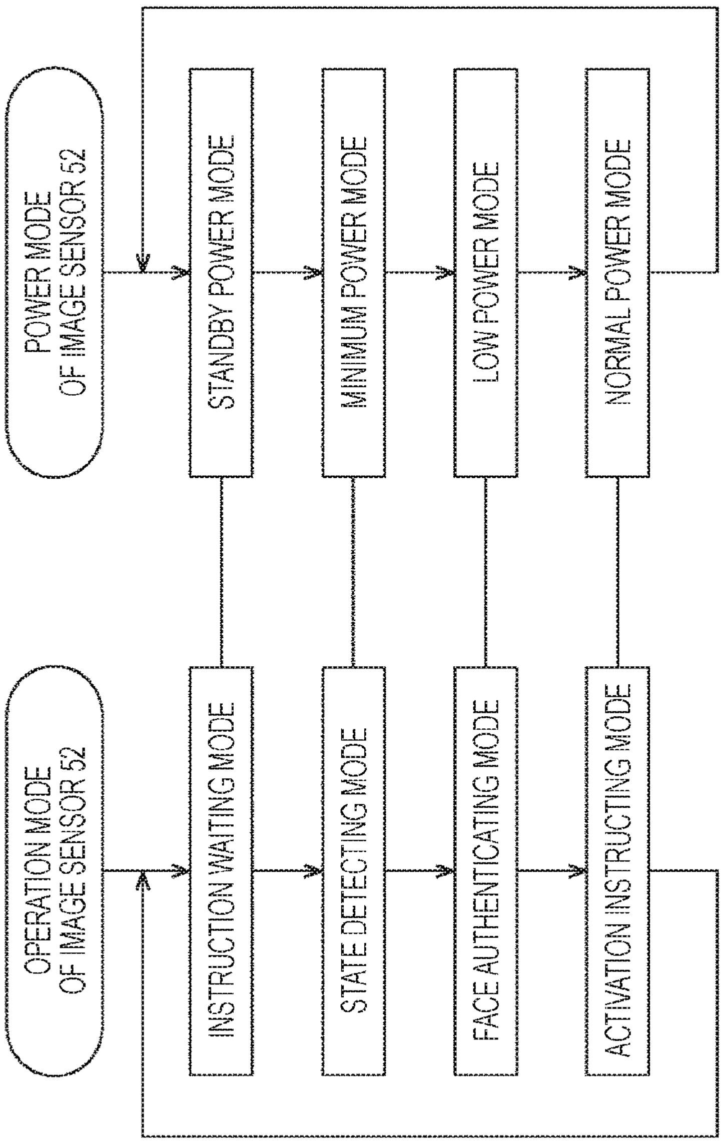
FIG. 8 is a diagram for explaining operation modes and power modes.

FIG. 8 is a diagram showing the relationship between operation modes and power modes of the image sensor 52. When the image sensor 52 is in the instruction waiting mode in which an instruction from the application processor 51 is awaited, the image sensor 52 is in a standby power mode. The standby power mode is the mode that lasts until an instruction to switch to the state detecting mode is issued from the application processor 51 in step S31 (FIG. 6), for example.

In the standby power mode, an application for capturing an image is activated, for example. When imaging is performed by the imaging unit 67, the power required for the imaging is consumed in that mode. In other words, in the standby power mode, the power to be consumed by the image sensor 52 varies depending on the operations of the other components.

In the instruction waiting mode, when an instruction to switch to the state detecting mode is issued from the application processor 51, the image sensor 52 switches from the instruction waiting mode to the state detecting mode. In the state detecting mode, the power mode is a minimum power mode. In the minimum power mode, the state detection unit 66 is in an activated state. The minimum power mode is the mode at the time when the procedures in steps S101 through S103 (FIG. 7) are carried out, for example.

In the state detecting mode, when the state detection unit 66 detects that the terminal 10 is held in front of the face of the user, the image sensor 52 switches from the state detecting mode to the face authenticating mode. In the face authenticating mode, the power mode is the low power mode. In the low power mode, the imaging unit 67 (part of the imaging unit 67) and the face detection/recognition unit 68 are in an activated state. The low power mode is the mode at the time when the procedures in steps S104 through S107 (FIG. 7) are carried out, for example.

In the face authenticating mode, when the face detection/recognition unit 68 determines that an image of a user registered as the user of the terminal 10 has been captured, the image sensor 52 switches from the face authenticating mode to the activation instructing mode. The activation instructing mode is a mode in which a notification can be issued to the application processor 51, and a larger amount of power is required than that in a case where only the inside of the image sensor 52 is controlled.

In the activation instructing mode, the power mode is a normal power mode. The normal power mode is the mode at the time when the procedure in step S16 (FIG. 6) (step S108 (FIG. 7)) is carried out, for example.

After the activation instructing mode, the operation mode is returned to the instruction waiting mode, and the power mode is returned from the normal power mode to the standby power mode. Such mode transition is repeated.

These power modes arranged in order of power consumption are minimum power mode<low power mode<normal power mode. In the standby power mode, there is a possibility of change in power consumption, and therefore, comparisons with these modes are not made herein.

As the power mode of the image sensor 52 varies depending on the operation mode in this manner, the electric power to be consumed by the image sensor 52 can be reduced. Further, as processes such as state detection and face recognition are performed in the image sensor 52, the electric power to be consumed by the terminal 10 can be reduced.

For example, in a case where face recognition is performed outside the image sensor 52, a face recognition application is controlled by the application processor 51 during the face recognition. In such a case, the above described processes cannot be performed, unless the application processor 51 is activated to start the face recognition application even when the terminal 10 is in a locked state.

In this embodiment, on the other hand, the application processor 51 is not in an activated state when the terminal 10 is in a locked state. Accordingly, it is apparent that power consumption can be reduced by this embodiment.

Further, the image sensor 52 operates in a plurality of power modes. Accordingly, fine power control can be performed, and thus, power consumption can be reduced.

As described above, according to this embodiment, power consumption can be reduced.

<Where an Image Sensor is Formed with a Stack Structure>

The image sensor 52 shown in FIG. 2 may be formed as one package in which each component is formed on one substrate. In other words, the mode control unit 61, the sensor control unit 62, the sensor input interfaces 63 through 65, the state detection unit 66, the imaging unit 67, and the face detection/recognition unit 68, which constitute the image sensor 52, may be formed on one substrate, and may be formed as one package.

Figure 9:
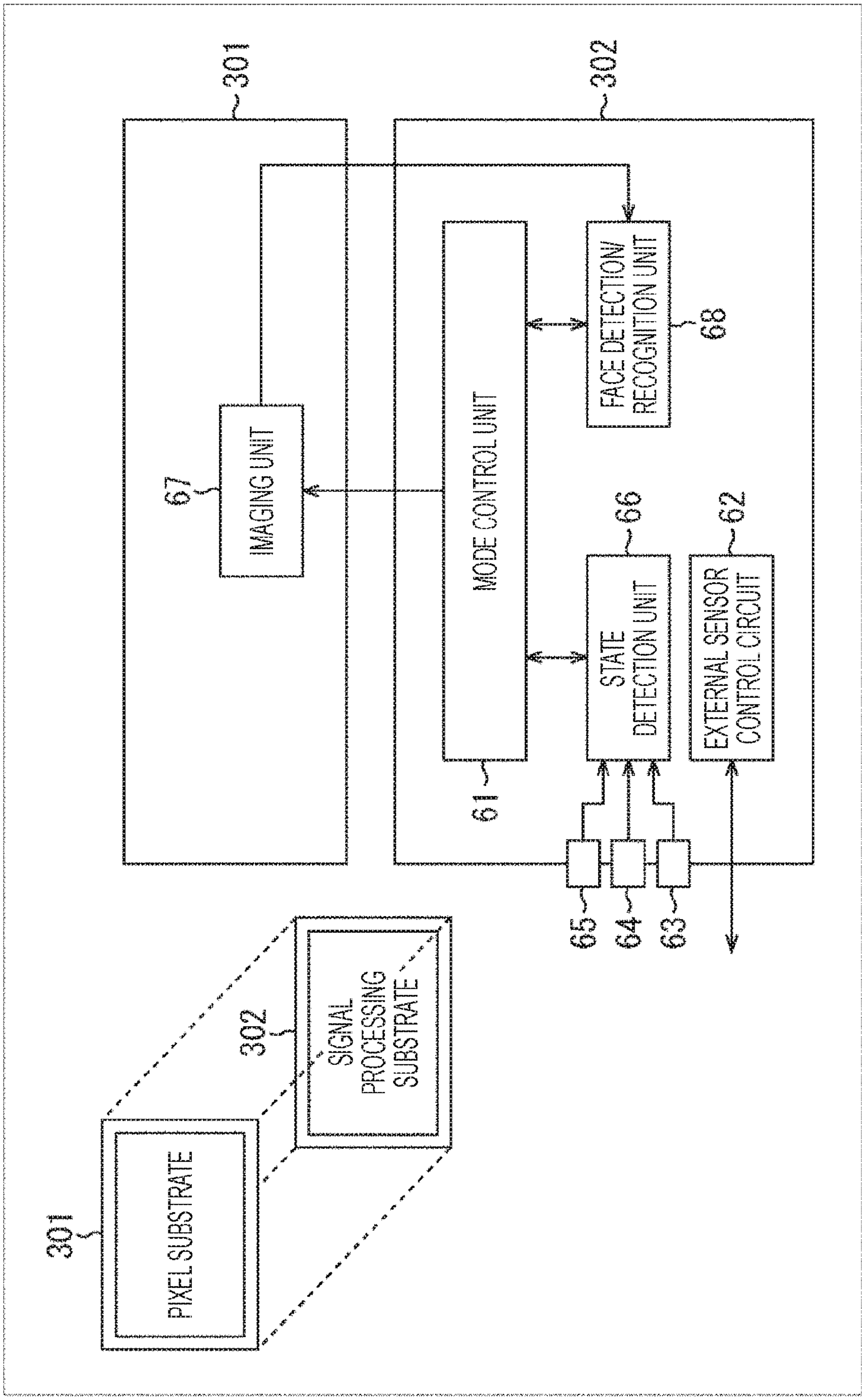
FIG. 9 is a diagram for explaining a stacked image sensor.

Further, the image sensor 52 shown in FIG. 2 can be formed with a stacked image sensor manufactured by stacking a plurality of substrates (dies). FIG. 9 is a diagram showing an example configuration of a stacked image sensor that includes the image sensor 52 shown in FIG. 2. The stacked image sensor shown in FIG. 9 has a two-layer structure in which a pixel substrate 301 and a signal processing substrate 302 are stacked.

The imaging unit 67 included in the image sensor 52 is formed on the pixel substrate 301. In addition, although not shown in the drawing, it is also possible to form the pixel array unit 111 (FIG. 3) included in the imaging unit 67 on the pixel substrate 301, and form the components other than the pixel array unit 111 of the imaging unit 67 on the signal processing substrate 302.

The mode control unit 61, the sensor control unit 62, the sensor input interfaces 63 through 65, the state detection unit 66, and the face detection/recognition unit 68 are formed on the signal processing substrate 302.

In this manner, the image sensor 52 may be formed as a stacked image sensor. Further, a stacked image sensor can be formed by stacking three layers or four or more layers of substrates, instead of two layers of substrates. For example, a memory (the feature amount storage unit 204 (FIG. 5) included in the face detection/recognition unit 68, for example) may be provided in a layer (a memory layer) other than the pixel substrate 301 and the signal processing substrate 302, and the memory layer may be provided between the pixel substrate 301 and the signal processing substrate 302, or on the lower side of the signal processing substrate 302.

Alternatively, a three-layer structure may be formed. In the three-layer structure, the sensor control unit 62, the sensor input interfaces 63 through 65, and the state detection unit 66 are formed in the third layer, the mode control unit 61 and the face detection/recognition unit 68 are formed in the second layer, and the imaging unit 67 is formed in the first layer.

In such a configuration, electric power may be supplied to the third layer in the state detecting mode (the minimum power mode), and electric power may be supplied to the second layer and the first layer in the face authenticating mode (the low power mode). In other words, the layer to which electric power is supplied can be selectively controlled in accordance with the power mode.

In this manner, the image sensor 52 can be formed as a stacked image sensor, and can also be formed as one package.

Note that, in the above described embodiment, the terminal 10 has been described as an example. However, it is also possible to install the image sensor 52 in a device other than the terminal 10, and add the above described function of canceling a locked state to the device. In other words, the present technology can be applied to a device that has a locked state and has a function of canceling the locked state.

Further, in the above described embodiment, a case where a locked state is canceled has been described as an example. However, the present technology can be applied to an authentication device that authenticates users. In other words, in the above description, an example in which a user is authenticated and a locked state is then canceled has been described. However, the present technology can also be applied to a device that authenticates users. For example, the present technology can also be applied to a device that authenticates a user, and performs a process associated with the authenticated user, such as a process of activating a predetermined application.

Further, in the above described embodiment, the image sensor 52 includes the face detection/recognition unit 68, and user authentication is performed in the image sensor 52. However, the process relating to user authentication may be performed by a component other than the image sensor 52.

For example, the face detection/recognition unit 68 may be provided outside the image sensor 52, and be controlled by the application processor 51. Further, in such a configuration, when a held-by-user state is detected by the state detection unit 66, an instruction to activate the application processor 51 is issued from the mode control unit 61.

In other words, detection of a predetermined state by the image sensor 52 may be set as a trigger for activation of the application processor 51, and the application processor 51 may then be activated. In such a configuration, under the control of the application processor 51, the above described user authentication can be performed, and a locked state can be canceled. Further, some other process can be performed by the application processor 51.

Alternatively, a trigger for activation of the application processor 51 is issued not only in a state in which the user holds the terminal 10 but also in a case where a predetermined object is sensed or the like. In this manner, various modifications may be made.

Further, in the above described embodiment, a case where a user is authenticated has been described as an example. However, the present technology can also be applied in a case where objects other than users are authenticated (detected). For example, the above described image sensor 52 is installed in a vehicle, and, in the state detecting mode, the image sensor 52 determines whether or not the vehicle has started running.

In that case, when the vehicle is running, the mode switches to the face recognizing mode, and a person is detected in the mode (therefore, this mode can be referred to as the human recognizing mode). When a person is detected, the vehicle is controlled so as to perform a predetermined process such as decelerating. The present technology can also be applied in such a case.

In view of this, examples to which the present technology can be applied are described below.

<Examples of Use of an Image Sensor>

Figure 10:
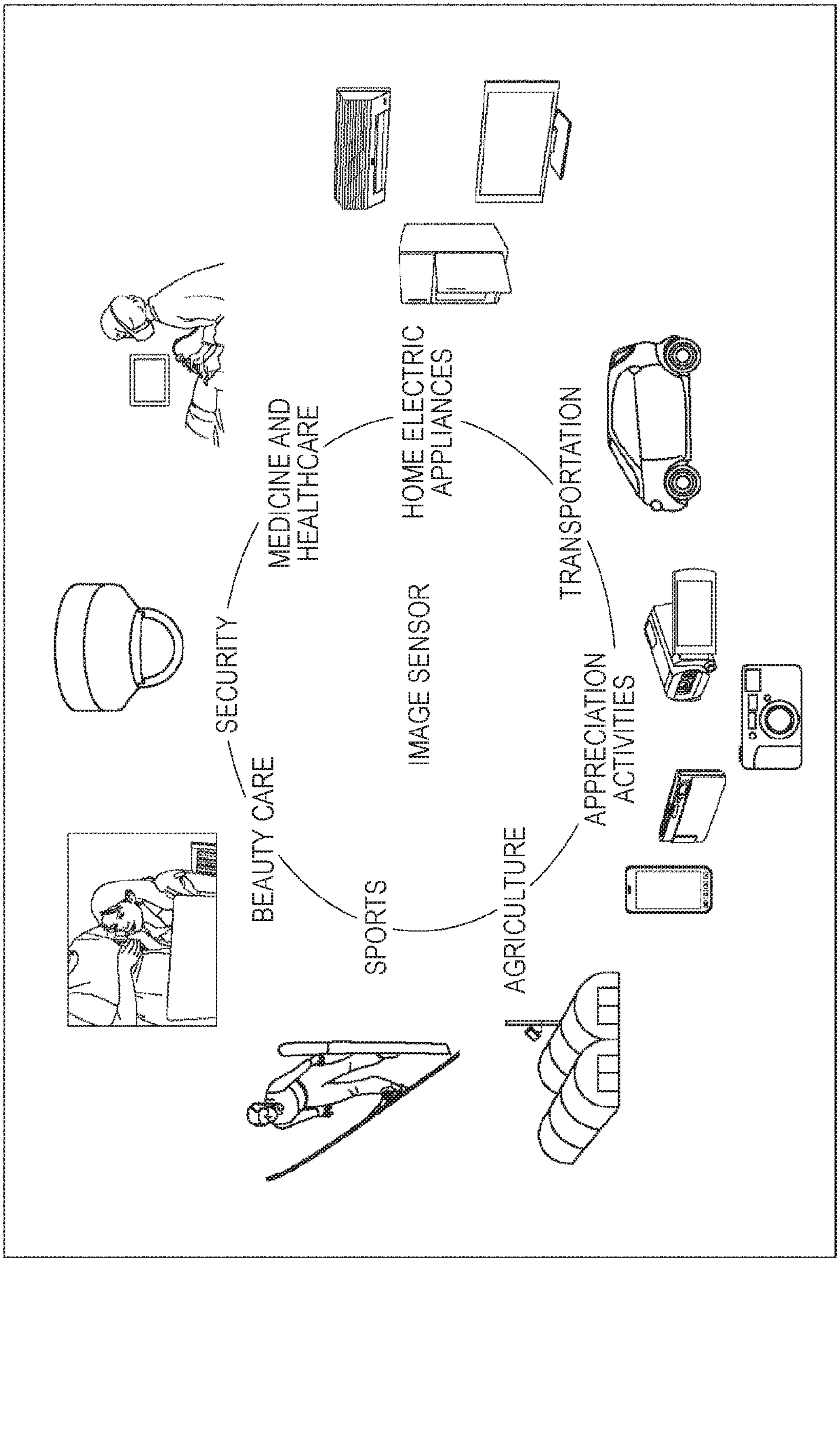
FIG. 10 is a diagram for explaining examples of use of the image sensor.

FIG. 10 is a diagram showing examples of use of the above described image sensor 52.

The image sensor 52 can be used in various cases where light such as visible light, infrared light, ultraviolet light, or an X-ray is sensed, as described below, for example.

- Devices configured to take images for appreciation activities, such as digital cameras and portable devices with camera functions.
- Devices for transportation use, such as vehicle-mounted sensors configured to take images of the front, the back, the surroundings, the inside, and the like of an automobile to perform safe driving like an automatic stop or recognize a driver's condition and the like, surveillance cameras for monitoring running vehicles and roads, and ranging sensors for measuring distances between vehicles or the like.
- Devices to be used in conjunction with home electric appliances, such as television sets, refrigerators, and air conditioners, to take images of gestures of users and operate the appliances in accordance with the gestures.
- Devices for medical care use and health care use, such as endoscopes and devices for receiving infrared light for angiography.
- Devices for security use, such as surveillance cameras for crime prevention and cameras for personal authentication.
- Devices for beauty care use, such as skin measurement devices configured to image the skin and microscopes for imaging the scalp.
- Devices for sporting use, such as action cameras and wearable cameras for sports and the like.
- Devices for agricultural use such as cameras for monitoring conditions of fields and crops.

The image sensor 52 can be applied to both a device that uses electrons as signal charges and a device that uses holes as signal charges.

In addition, the present disclosure can be applied not only to imaging devices that sense an incident light quantity distribution of visible light and form an image based on the distribution, but also to imaging devices (physical quantity distribution sensors) in general, such as an imaging device that senses an incident quantity distribution of infrared rays, X-rays, particles, or the like, and forms an image based on the distribution, or a fingerprint sensor that senses a distribution of some other physical quantity in a broad sense, such as pressure or capacitance, and forms an image based on the distribution.

<Recording Medium>

The above described series of processes can be performed by hardware, or can be performed by software. In a case where the series of processes are to be performed by software, the program that forms the software is installed into a computer. Here, the computer may be a computer incorporated into special-purpose hardware, or may be a general-purpose personal computer or the like that can execute various kinds of functions, having various kinds of programs installed thereinto, for example.

Figure 11:
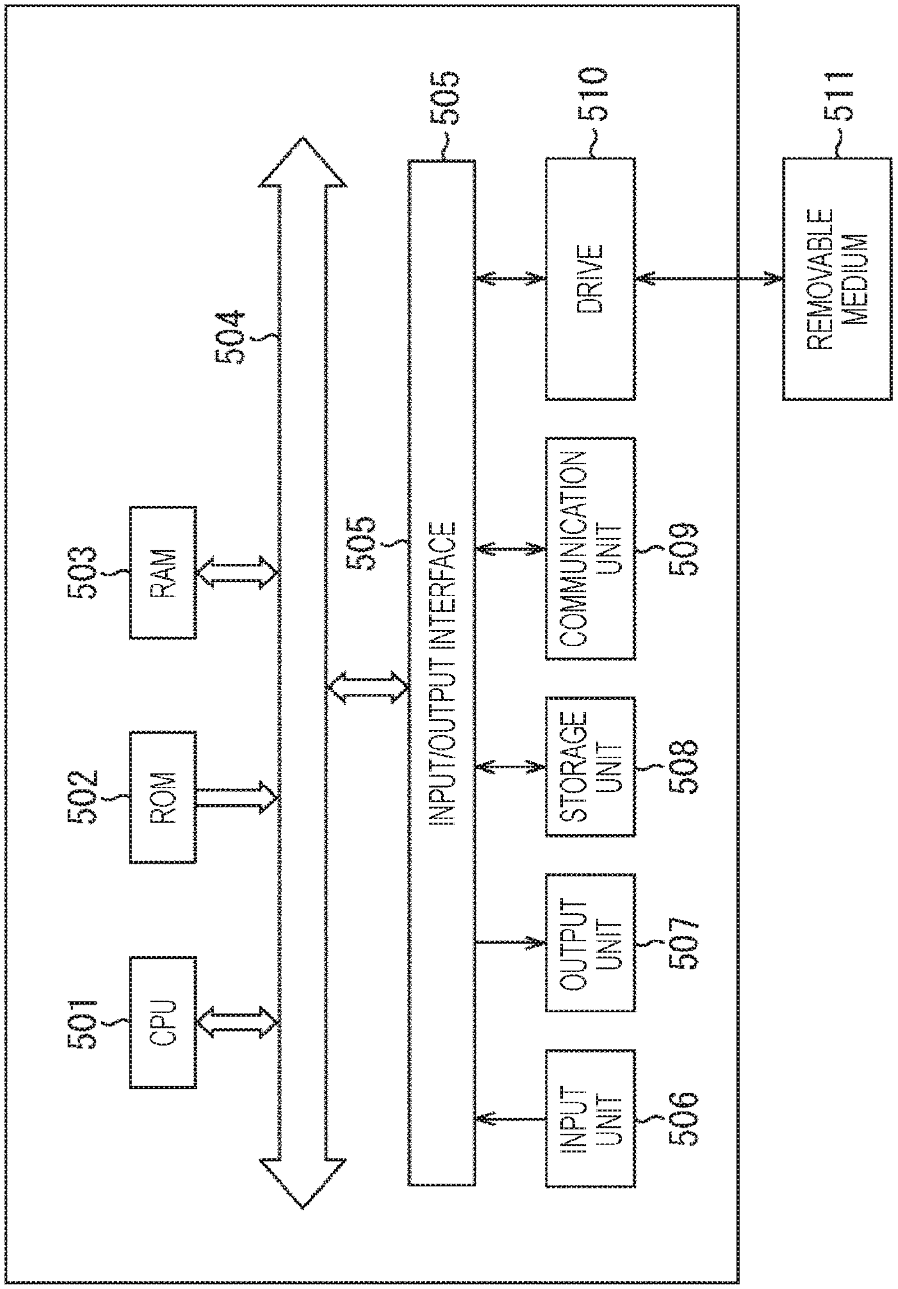
FIG. 11 is a flowchart for explaining a recording medium.

FIG. 11 is a block diagram showing an example configuration of the hardware of a computer that performs the above described series of processes in accordance with a program. In the computer, a central processing unit (CPU) 501, a read only memory (ROM) 502, and a random access memory (RAM) 503 are connected to one another by a bus 504. An input/output interface 505 is further connected to the bus 504. An input unit 506, an output unit 507, a storage unit 508, a communication unit 509, and a drive 510 are connected to the input/output interface 505.

The input unit 506 is formed with a keyboard, a mouse, a microphone, and the like. The output unit 507 is formed with a display, a speaker, and the like. The storage unit 508 is formed with a hard disk, a nonvolatile memory, or the like. The communication unit 509 is formed with a network interface or the like. The drive 510 drives a removable medium 511 such as a magnetic disk, an optical disk, a magneto-optical disk, or a semiconductor memory.

In the computer having the above described configuration, the CPU 501 loads a program stored in the storage unit 508 into the RAM 503 via the input/output interface 505 and the bus 504, for example, and executes the program, so that the above described series of processes are performed.

The program to be executed by the computer (the CPU 501) may be recorded on the removable medium 511 as a packaged medium or the like to be provided, for example. Alternatively, the program can be provided via a wired or wireless transmission medium, such as a local area network, the Internet, or digital satellite broadcasting.

In the computer, the program can be installed into the storage unit 508 via the input/output interface 505 when the removable medium 511 is mounted on the drive 510. Alternatively, the program may be received by the communication unit 509 through a wired or wireless transmission medium, and be installed into the storage unit 508. Also, the program may be installed beforehand into the ROM 502 or the storage unit 508.

It should be noted that the program to be executed by the computer may be a program for performing processes in chronological order in accordance with the sequence described in the present specification, or may be a program for performing processes in parallel or performing a process when necessary, such as when there is a call.

Further, in this specification, a system means an entire apparatus formed with a plurality of devices.

Note that the advantageous effects described in this specification are merely examples, and the advantageous effects of the present technology are not limited to them or may include other effects.

Note that embodiments of the present technology are not limited to the above described embodiments, and various modifications may be made to them without departing from the scope of the present technology.

Note that the present technology may also be embodied in the configurations described below.

(1)

An image processing device including:

a detection unit that detects a predetermined state, using data from a plurality of sensors; and an imaging unit that captures an image of a predetermined object, in a case where the predetermined state is detected by the detection unit.

(2)

The image processing device according to (1), further including a plurality of input interfaces that input the data from the plurality of sensors.

(3)

The image processing device according to (1) or (2), in which detection by the detection unit is started when an application processor switches from an activated state to a non-activated state.

(4)

The image processing device according to any of (1) to (3), in which, when the predetermined state is detected by the detection unit, the imaging unit is activated.

(5)

The image processing device according to any of (1) to (4), in which the detection unit detects whether or not the predetermined state is a state in which the imaging unit is capable of capturing an image of a face of a user.

(6)

The image processing device according to any of (1) to (5), further including a recognition unit that determines whether or not a user is a registered user, using the image captured by the imaging unit.

(7)

The image processing device according to (6), in which the detection unit performs detection when in a locked state, and, in a case where the user is determined to be a registered user by the recognition unit, the locked state is canceled.

(8)

The image processing device according to (7), in which an instruction to cancel the locked state is issued to an application processor.

(9)

The image processing device according to (7), in which the imaging unit performs imaging with a necessary number of pixels for authentication to be performed by the recognition unit.

(10)

An image processing method including the steps of:

detecting a predetermined state, using data from a plurality of sensors; and capturing an image of a predetermined object, in a case where the predetermined state is detected.

(11)

A program for causing a computer to perform a process of:

detecting a predetermined state, using data from a plurality of sensors; and capturing an image of a predetermined object, in a case where the predetermined state is detected.

(12)

An image sensor including:

a detection unit that detects a predetermined state, using data from a plurality of sensors; and an imaging unit that captures an image of a predetermined object, in a case where the predetermined state is detected by the detection unit.

(13)

The image sensor according to (12), further including a plurality of input interfaces that input the data from the plurality of sensors.

(14)

The image sensor according to (12) or (13), further including a recognition unit that determines whether or not a user is a registered user, using the image captured by the imaging unit.

(15)

The image sensor according to (14), in which the detection is performed in a locked state, and, in a case where the user is determined to be a registered user, the locked state is canceled.

(16)

The image sensor according to any of (12) to (15), which has a stack structure.

(17)

The image sensor according to any of (12) to (16), which is formed as a package.

(18)

An information processing device including:

a plurality of sensors;

an image sensor; and an application processor, in which the image sensor includes:

a plurality of input interfaces that input data from the plurality of sensors;

a detection unit that detects a predetermined state, using the data from the plurality of sensors input via the input interfaces; and an imaging unit that captures an image of a predetermined object, in a case where the predetermined state is detected by the detection unit.

(19)

The information processing device according to (18), in which the image sensor further includes a recognition unit that determines whether or not a user is a registered user, using the image captured by the imaging unit.

(20)

The information processing device according to (19), in which the detection unit starts detection from a time when receiving an instruction to switch to a locked state from the application processor, and, in a case where the recognition unit determines that the user is a registered user, an instruction to cancel the locked state is issued to the application processor.

REFERENCE SIGNS LIST

10 Terminal
11 Display unit
12 Imaging unit
13 Microphone
51 Application processor
52 Image sensor
53 Acceleration sensor
54 Geomagnetic sensor
55 Proximity sensor
61 Mode control unit
62 Sensor control unit

63 to 65 Sensor input interface
66 State detection unit
67 Imaging unit
68 Face detection/recognition unit

The invention claimed is:

1. An image processing device, comprising:

a detection unit configured to:

detect, in a state detection mode, a state of a device based on data from a plurality of sensors, wherein the state detection mode is operated in a minimum power mode;

determine that the state of the device is a first state in which face detection is prohibited;

determine a change in the state of the device from the first state to a second state in which the device is held for the face detection;

an imaging unit configured to capture, in a face authentication mode, an image of a determined object based on the change in the state of the device from the first state to the second state; and a recognition unit configured to determine, in the face authentication mode, a user is a registered user based on the image captured by the imaging unit, wherein the face authentication mode is activated based on the change in the state of the device from the first state to the second state, the face authentication mode is operated in a low power mode, the detection unit further configured to cancel, in a normal power mode, a locked state of the device based on the determination that the user is the registered user, a power consumption in the minimum power mode is lower than a power consumption in the low power mode, and the power consumption in the low power mode is lower than a power consumption in the normal power mode.

2. The image processing device according to claim 1, further comprising a plurality of input interfaces configured to input the data from the plurality of sensors.

3. The image processing device according to claim 1, wherein the detection unit is further configured to start the detection at a time an application processor switches from an activated state to a non-activated state.

4. The image processing device according to claim 1, wherein the imaging unit is activated, at a time a determined state of the device is detected by the detection unit.

5. The image processing device according to claim 1, wherein the detection unit is further configured to execute the detection at a time the device is in the locked state.

6. The image processing device according to claim 5, further comprising a mode control unit configured to issue an instruction to an application processor to cancel the locked state of the device.

7. The image processing device according to claim 5, wherein the imaging unit is further configured to execute an imaging process with a specific number of pixels for authentication by the recognition unit, and the specific number of pixels is less than a total number of pixels in a pixel array.

8. An image processing method, comprising:

detecting, in a state detection mode, a state of a device based on data from a plurality of sensors, wherein the state detection mode is operated in a minimum power mode;

determining that the state of the device is a first state in which face detection is prohibited;

determining a change in the state of the device from the first state to a second state in which the device is held for the face detection;

capturing, in a face authentication mode, an image of a determined object based on the change in the state of the device from the first state to the second state;

determining, in the face authentication mode, a user is a registered user based on the captured image, wherein the face authentication mode is activated based on the change in the state of the device from the first state to the second state, and the face authentication mode is operated in a low power mode; and canceling, in a normal power mode, a locked state of the device based on the determination that the user is the registered user, wherein a power consumption in the minimum power mode is lower than a power consumption in the low power mode, and the power consumption in the low power mode is lower than a power consumption in the normal power mode.

9. A non-transitory computer-readable medium having stored thereon computer-readable instructions which when executed by a computer, cause the computer to execute operations, the operations comprising:

detecting, in a state detection mode, a state of a device based on data from a plurality of sensors, wherein the state detection mode is operated in a minimum power mode;

determining that the state of the device is a first state in which face detection is prohibited;

determining a change in the state of the device from the first state to a second state in which the device is held for the face detection;

capturing, in a face authentication mode, an image of a determined object based on the change in the state of the device from the first state to the second state;

determining, in the face authentication mode, a user is a registered user based on the captured image, wherein the face authentication mode is activated based on the change in the state of the device from the first state to the second state, and the face authentication mode is operated in a low power mode; and canceling, in a normal power mode, a locked state of the device based on the determination that the user is the registered user, wherein a power consumption in the minimum power mode is lower than a power consumption in the low power mode, and the power consumption in the low power mode is lower than a power consumption in the normal power mode.

10. An image sensor, comprising:

a detection unit configured to:

detect, in a state detection mode, a state of a device based on data from a plurality of sensors, wherein the state detection mode is operated in a minimum power mode;

determine that the state of the device is a first state in which face detection is prohibited;

determine a change in the state of the device from the first state to a second state in which the device is held for the face detection;

an imaging unit configured to capture, in a face authentication mode, an image of a determined object based on the change in the state of the device from the first state to the second state; and a recognition unit configured to determine, in the face authentication mode, a user is a registered user based on the image captured by the imaging unit, wherein the face authentication mode is activated based on the change in the state of the device from the first state to the second state, the face authentication mode is operated in a low power mode, the detection unit further configured to cancel, in a normal power mode, a locked state of the device based on the determination that the user is the registered user, a power consumption in the minimum power mode is lower than a power consumption in the low power mode, and the power consumption in the low power mode is lower than a power consumption in the normal power mode.

11. The image sensor according to claim 10, further comprising a plurality of input interfaces configured to input the data from the plurality of sensors.

12. The image sensor according to claim 10, wherein the detection unit is further configured to execute the detection at a time the device is in the locked state.

13. The image sensor according to claim 10, wherein the image sensor has a stack structure.

14. The image sensor according to claim 10, wherein the image sensor is formed as a package.

15. An information processing device, comprising:

a plurality of sensors;

an image sensor; and an application processor, wherein the image sensor includes:

a plurality of input interfaces configured to receive data from the plurality of sensors;

a detection unit configured to:

detect, in a state detection mode, a state of the information processing device based on the data from the plurality of sensors, wherein the state detection mode is operated in a minimum power mode;

determine that the state of the information processing device is a first state in which face detection is prohibited; and determine a change in the state of the information processing device from the first state to a second state in which the information processing device is held for the face detection;

an imaging unit configured to capture, in a face authentication mode, an image of a determined object, based on the change in the state of the information processing device from the first state to the second state; and a recognition unit configured to determine, in the face authentication mode, a user is a registered user based on the image captured by the imaging unit, wherein the face authentication mode is activated based on the change in the state of the information processing device from the first state to the second state, the face authentication mode is operated in a low power mode, and the detection unit further configured to cancel, in a normal power mode, a locked state of the information processing device based on the determination the user is the registered user, a power consumption in the minimum power mode is lower than a power consumption in the low power mode, and the power consumption in the low power mode is lower than a power consumption in the normal power mode.

16. The information processing device according to claim 15, wherein the detection unit is configured to start detection at a time a first instruction to switch to the locked state is received from the application processor.

* * * * *